United States Patent Office 2,810,744
Patented Oct. 22, 1957

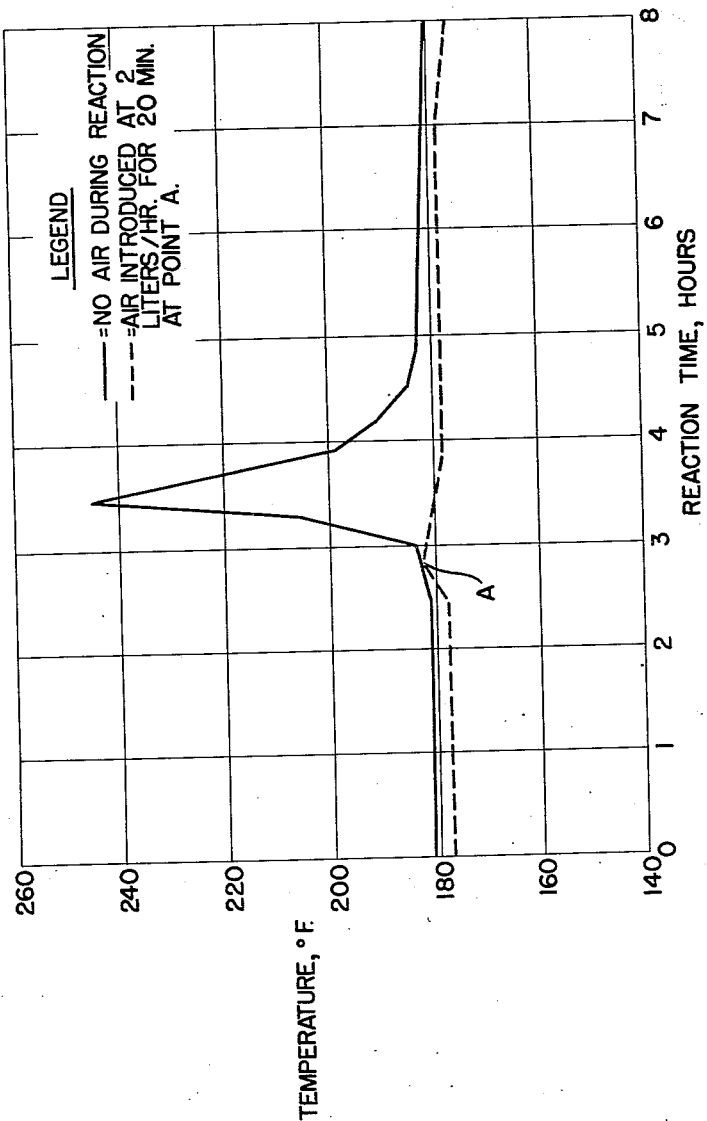

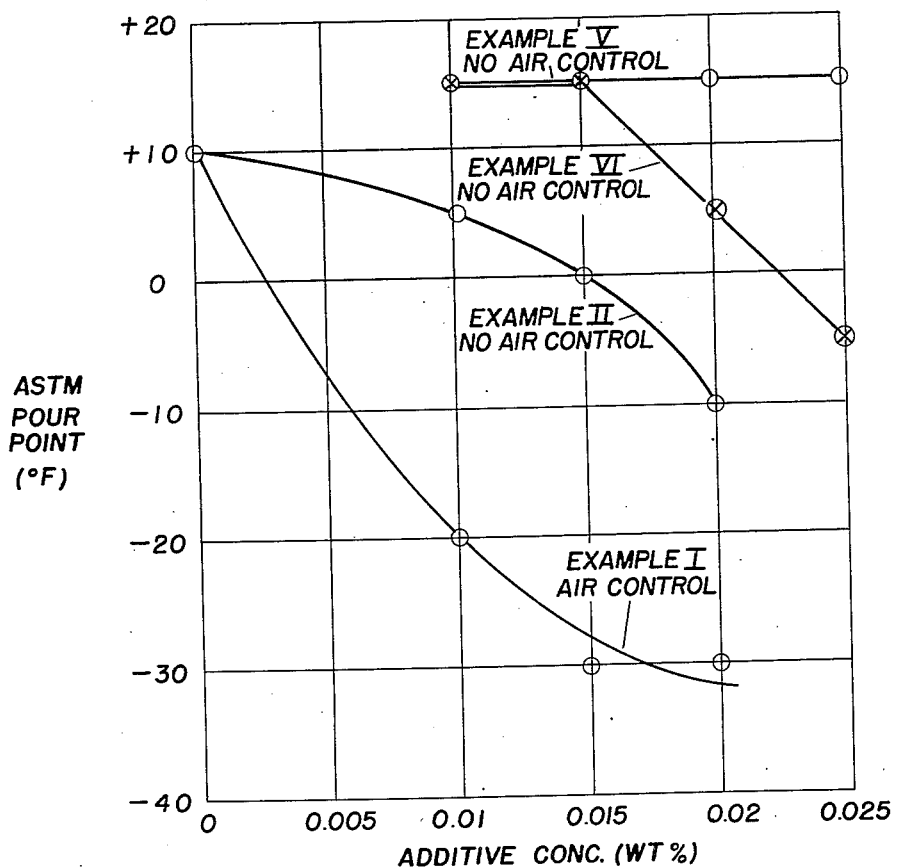
FIG. - II

2,810,744

POLYMERIZATION PROCESS FOR PREPARING LUBRICANT ADDITIVES AND PRODUCTS

Alexander H. Popkin, Newark, N. J., assignor to Esso Research and Engineering Company, a corporation of Delaware Application March 25, 1955, Serial No. 496,678

8 Claims. (Cl. 260—485)

This invention relates to an improved polymerization process. Particularly, this invention relates to a process for the formation of lubricating oil additives having the desirable characteristics of improving the pour point of lubricating oils with which they are blended. More particularly, this invention relates to an improved process for the copolymerization of ethylenically unsaturated polycarboxylic acid esters with other polymerizable monomeric materials in the presence of an oxygen containing gas to prevent undesirable gelation.

The art of lubricating oil additive manufacture has long been familiar with the preparation of polymers and copolymers to form materials useful for improving desirable characteristics of lubricating oils. Of particular interest in recent years has been the development of additive materials for improving the rate of change of viscosity of an oil with a change in temperature, that is, viscosity index, and for improving the pour point of a lubricating oil, that is, lowering the temperature at which the lubricating oil loses its property of free flow. Such materials as polymers and copolymers of acrylate and methacrylate esters, polymers and copolymers of alpha-beta unsaturated polycarboxylic acid esters, etc., have been found to be very satisfactory for many purposes. It has also been found, however, that the preparation of these polymers and copolymers presents many technical difficulties. Foremost among them is the problem of gelation and the formation of oil insoluble products. It is believed that this phenomenon is a result of undesirable cross linking or interlinking of neighboring long chain molecules with the result that the product formed remains a cohesive mass and will not dissolve in the oil used as the blend oil.

It has now been found, and forms the object of this invention, that copolymers having outstanding utility as pour point depressants may be prepared by a process utilizing an oxygen containing gas in the copolymerization step with the formation of a product which is free from any tendency toward oil insolubility and has increased potency as a pour point depressor. This concept is very surprising considering the teaching of the literature in respect to the necessity for the exclusion of oxygen from a copolymerization reaction.

Generally speaking, this invention involves the admixture of the materials to be polymerized or copolymerized and subjecting the mixture to the action of an oxygen containing gas at some point during the copolymerization. In some instances, it may be desirable to carry out the reaction under a blanket of an oxygen containing gas. In other instances, it may be desirable to inject a stream of the oxygen containing gas into the reaction mixture at some particular point, or throughout the reaction. This will be described more in detail below.

The improved process of this invention is applicable to the polymers or copolymers of copolymerizable materials in general. It has particular advantage, however, when applied to the copolymerization of ethylenically unsaturated polycarboxylic acids with other polymerizable monomeric materials in the presence of peroxide catalysts.

The ethylenically unsaturated polycarboxylic acid esters may be represented by the following formula:

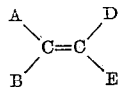

wherein (1) A and D are carboxylic acid ester groups

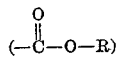

and B and E are hydrogen, i. e., fumaric acid esters, maleic acid esters, etc.

(2) A and D are carboxylic acid ester groups, as above, and either B or E is a methyl group, the other being hydrogen, i. e., citraconic acid esters, mesaconic acid esters, etc.

(3) A and B are hydrogen, D is a carboxylic acid ester group, and E is a methylene carboxylic acid ester group, i. e., itaconic acid esters, etc.

(4) A and D are carboxylic acid ester groups as above, E is a methylene carboxylic acid ester group, and B is hydrogen, i. e., aconitic acid esters.

Although any of the polycarboxylic acid esters, according to the formula above, are operable in the process of this invention, the alpha-beta unsaturated dicarboxylic acid esters are particularly advantageous. The ester groups of a mixture of alcohols, each having from 8 to 18 carbon atoms, and the mixture having from 12 to 14 carbon atoms per average side chain length are particularly advantageous when a pour depressant is being prepared. The alcohols obtained by the hydrogenation of coconut oil and having an average carbon chain length of 13.5 is commercially available and widely used. The preferred embodiment of this invention involves the use of esters of alpha-beta unsaturated dicarboxylic acids, such as fumaric and maleic, wherein the alcohol components of the mixed ester group contains an average of from 12 to 14 carbon atoms, the coconut alcohols being included within this preferred range.

The process of invention may be used to prepare polymers of the above described materials and useful polymers are formed therefrom. Also very desirable copolymers may be formed by copolymerizing with the acid esters as described above, other polymerizable monomeric materials. These materials may be represented by the following formula:

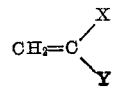

wherein (1) X is hydrogen and Y is an ester group

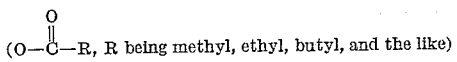

i. e., vinyl acetate, vinyl butyrate, and the like.

(2) X is methyl and Y is as described above, i. e., isopropenyl acetate, etc.

(3) X is a halogen and Y is as described above, i. e., alpha-chlorovinyl acetate, etc.

(4) X is hydrogen or methyl and Y is an aromatic group, i. e., styrene, alpha-methyl styrene, and the like.

(5) X is hydrogen or methyl and Y is —C≡N, i. e., acrylonitrile, etc.

Although any of the polymerizable monomeric materials typified by the formula above are operable to form useful copolymers with the acid esters outlined above, the preferred embodiment contemplates the use of low molecular weight vinyl esters of acetic, propionic and butyric acid, i. e. the lower alkanoic acids and their substitution products. Vinyl acetate is particularly desirable.

Depending upon the desired product, the monomers in the copolymerization reaction utilizing the process of invention may be varied greatly. However, when a copolymer of a dibasic acid ester and vinyl acetate is being prepared, it is desirable that from 2% to 40% of vinyl acetate, preferably 10% to 25%, be used with the dibasic acid. A copolymer of 80% dibasic acid ester with 20% vinyl acetate has outstanding pour depressant qualities.

The process of the instant invention may be applied to any of the well known polymerization techniques. For instance, the bulk polymerization technique wherein the catalyst used is added directly to the mixture of the monomers alone may be used applying the process of invention. If it is desired, the solution polymerization technique may be utilized, that is, the technique of polymerization in which the monomers are dissolved in an inert solvent, ranging from heavy motor oil fractions to petroleum hydrocarbons, including chlorinated petroleum cuts, etc., and the catalyst added. When the solution polymerization technique is used, it is preferred that the monomer concentration in the diluent range from 30% to 99% by weight, based on the weight of the total mixture. The suspension technique of polymerization or the emulsion polymerization technique wherein an emulsifying agent such as a soap is used to form an emulsion with the monomers and water and a water soluble catalyst is utilized may also be adapted to the process of invention with excellent results.

The reaction conditions to be experienced in the inventive process may also be varied within wide ranges. In the preferred embodiment, the copolymerization of dibasic acid esters with other polymerizable materials, it is preferred that temperatures within a range of from room temperature to 250° F., preferably 100° to 200° F., be utilized. In most instances, it will be found advantageous to utilize from .05% to 3% by weight, based on the weight of the monomers, of a peroxide catalyst, wtih .2% to 2.0% by weight being preferred. Among the operable catalysts are hydrogen peroxide, beznyl peroxide, cumene hydroperoxide, potassium persulfate, lauroyl peroxide, ammonium persulfate, urea hydroperoxide, tert.-butyl hydroperoxide, tert.-butyl perbenzoate, and the like, benzoyl peroxide being used in the preferred embodiment.

The gist of this new improved process and, what may be termed the heart of the invention, involves the introduction into the polymerization or copolymerization mixture, an oxygen containing gas. This is contrary to all prior teachings, and it is indeed surprising that materials having outstanding qualities are prepared in a polymerization process which is subjected to the action of oxygen.

The introduction of the controlled amount of an oxygen containing gas, such as air, serves to maintain the reaction temperature near the equilibrium temperature, or that temperature at which the reaction proceeds most smoothly without the characteristic temperature rise and resulting gelation which may accompany it.

If it is desired, the reaction may take place in the presence of a blanket of an oxygen containing gas. It will be found more advantageous, however, and is contemplated in the preferred embodiment, to utilize a procedure of injecting an oxygen containing gas into the polymerization or copolymerization reaction at some point during the reaction itself. The data given below show that best results are obtained by injecting controlled amounts of an oxygen containing gas into the reaction mixture.

The oxygen containing gas is preferably air, however, any mixture of a non-reactive gas containing oxygen such as mixtures of nitrogen and oxygen, and the like, may be utilized in this invention.

In order to more explicitly define the invention described above, and to more clearly point out its operation, the following examples are given:

EXAMPLE I.—INVENTIVE CONCEPT

Into a liter round bottomed flask was placed 120 g. of a maleate ester of the mixture of alcohols obtained by hydrogenation of coconut oil (average carbon chain length 13.5). 64 g. of an acid-treated Mid-Continent distillate was added as a diluent. Air was blown into the flask for five minutes and 30 g. of freshly distilled vinyl acetate was added. To this reaction mixture was added a total of 2.4 g. of benzoyl peroxide and the reaction mixture was heated at about 150° F. for about 22 hours, the air blanket being maintained throughout the reaction mixture.

At the end of the reaction period the copolymeric material was a clear straw-colored solution in the diluent oil. Additional diluent oil was added until a solution was obtained containing 20% by weight of the active copolymer.

This 20% solution was used as a blending concentrate to prepare blends with the test oils containing various proportions of active copolymer. When submitted to the standard ASTM pour point determinations, the reduced pour points of the blends showed that the copolymer had excellent pour point depressing potency. Results of these determinations on a representative blend are set out in Table I below.

EXAMPLE II.—PRIOR ART METHOD

Utilizing the same amounts of the same ingredients as in Example I above, a similar product was prepared except that nitrogen was blow into the reaction mixture and a nitrogen blanket employed throughout the reaction period. The product was blended to a 20% copolymer concentrate as above.

The materials of Examples I and II were blended in in various concentrations in a Mid-Continent distillate of SAE 20 grade and were submitted to the standard ASTM pour point test. A comparison of the data obtained shows the outstanding advantage of the process of invention. The test data is set out in Table I below. For purposes of comparison data on a commercially popular pour point depressant of the methacrylate ester type is included:

Table I

ASTM POUR POINT (°F.) OF OIL A [1] BLENDS

| Pour Depressant | Wt. Percent Blend [2] | 0.020 | 0.015 | 0.010 |
| --- | --- | --- | --- | --- |
| None | | +10 | +10 | +10 |
| Example I | | −30 | −30 | −20 |
| Example II | | −10 | 0 | +5 |
| Commercial Methacrylate Ester Type Polymer | | −25 | −20 | −15 |

[1] Oil A—Conventionally refined Mid-Continent distillate of SAE 20 Grade.
[2] Active copolymer.

The data in Table I above shows the outstanding potency of the materials prepared in accordance with this invention. It will be noted that in the 0.02% blends the material prepared by the process of invention was 20 degrees more potent than the same material prepared by prior art techniques and 5 degrees more potent than the commercial methacrylate ester type pour depressor. This added degree of potency is a real advantage.

EXAMPLE III.—INVENTIVE CONCEPT

Into a five-liter round bottomed flask was placed 600 g. of a maleate ester of the alcohols obtained upon the hydrogenation of coconut oil (13.5 average carbon chain length) and 320 g. of a Mid-Continent base oil as a diluent. Air was blown into the reaction mixture for 20 minutes, after which time 150 g. of vinyl acetate was added. The mixture was heated to about 155° F. and the contents allowed to react in the presence of 12 g. of benzoyl peroxide catalyst. After 3 hours of reaction the temperature of the reaction mixture began to rise above that temperature level experienced before copolymerization started, that is, the equilibrium temperature of the reactants. When the temperature rise has reached 8° F. above the equilibrium temperature, air was blown through the reaction mixture for 20 minutes at the rate of two liters per hour. This caused the reaction temperature to drop and it gradually reached the equilibrium temperature.

The product obtained after 10 hours of reaction was a clear straw-colored solution in the diluent oil. It was blended to 20% concentrate with additional diluent oil and the concentrate used to prepare test blends. This material also had excellent ASTM pour point reducing potency as shown in the data given in Example IV.

EXAMPLE IV.—PRIOR ART METHOD

In accordance with the procedure outlined in Example III above, a second reaction was carried out using identical quantities of the same ingredients except that no air control was used. After about three hours of copolymerization reaction, the temperature rose to a peak of 60° F. above the equilibrium temperature. After about 2 hours the temperature gradually subsided to that of the equilibrium temperature. After a total reaction time of 8 hours the material of this example was removed from the reaction flask.

The product of Examples III and IV were blended in various concentrations with Mid-Continent distillates of SAE 20 and SAE 30 grades. These blends were submitted to the standard ASTM pour point determinations and the results are set out in Table II below. For purposes of comparison, a commercially popular pour point depressant of the methacrylate ester polymer type is included.

Table II

ASTM POUR POINTS (°F.) OF OIL BLENDS

| Pour Depressants | Wt. Percent of Blend [1] | | | |
|---|---|---|---|---|
| | Oil A [2] | | Oil B [2] | |
| | 0.025 | 0.015 | 0.025 | 0.015 |
| None | +10 | +10 | +15 | +15 |
| Example III | −35 | −30 | −10 | 0 |
| Example IV | −25 | 0 | +5 | +10 |
| Commercial Methacrylate Ester Type Polymer | −25 | −20 | −20 | −15 |

[1] Active copolymer.
[2] Oil A—A Mid-Continent distillate of SAE 20 Grade. Oil B—A Mid-Continent distillate of SAE 30 Grade.

The data reported in Table II above clearly point out the advantage of the process of this invention. The material of Example III prepared utilizing the inventive process shows a decided advantage in all concentrations over a similar material prepared according to prior art techniques and is superior to the commercially available pour depressant tested.

The advantage of the process of the instant invention is graphically illustrated in the accompanying drawings. In Figure I, the solid line represents the prior art technique as described in Example IV and the broken line represents the process of Example III illustrating the process of invention. It is clearly evident that the use of air control during the course of the polymerization results in a considerably greater uniformity of reaction. Figure II is a graphical representation of the potency of the products prepared in accordance with prior art techniques and in accordance with the process of the invention. The increased potency resulting from the process of the invention is obvious.

Copolymeric materials of the type disclosed herein have been disclosed in the prior art as having utility as synthetic lubricants. One of the prior art techniques for preparing synthetic lubricants was repeated, and is set out in Example V below.

EXAMPLE V 113 g. of di-n-dodecyl fumarate, 5.5 g. of freshly distilled vinyl acetate, and 1.19 g. of benzoyl peroxide, were mixed and slowly heated with stirring to 125° C. After heating for 2 hours at this temperature, the material was dissolved in benzene, transferred to a distilling flask, and heated to 150° C. and 150 mm. pressure. The material in the distilling flask was then allowed to cool to room temperature and was filtered through a layer of adsorptive clay.

The above example utilized a diester of fumaric acid wherein the ester groups were derived from a $C_{12}$ alcohol. To illustrate the lack of utility of this prior art process in the preparation of active pour point depressors even when using a mixture of alcohols, Example V was repeated as described in Example VI below.

EXAMPLE VI

Using 120 g. of the maleic acid ester of mixture of alcohols obtained on the hydrogenation of coconut oil and having an average side chain length of 13.5, 30 g. of freshly distilled vinyl acetate, and 2.4 of benzoyl peroxide, Example V was repeated.

The copolymeric materials prepared in accordance with Examples V and VI were blended in various concentrations in test oils A and B as described above and the blends were submitted to the standard ASTM pour point determinations. The results of these determinations are set out in Table III below.

Table III

ASTM POUR POINTS (°F.) OF OIL BLENDS

| Pour Depressant | Wt. Percent of Blend | | | | |
|---|---|---|---|---|---|
| | Oil A | | | Oil B | |
| | 0.025 | 0.020 | 0.015 | 0.025 | 0.015 |
| None | +10 | +10 | +10 | +15 | +15 |
| Example V | +15 | +15 | +15 | +15 | +15 |
| Example VI | −5 | +5 | +15 | −5 | +15 |

An examination of the data presented in Table III above clearly points out that the copolymeric materials of Example V wherein the dibasic acid was esterified with a single $C_{12}$ alcohol prepared in accordance with prior art techniques for the manufacture of synthetic lubricating compositions are entirely unsuited as pour point depressants. The data also shows that the prior art technique for preparing synthetic lubricants will not result in a satisfactory pour point depressant when materials are used in accordance with the instant claims.

The products prepared by the process of this invention may be blended with lubricating oils in concentrations varying from .001% to 10%, percentages being by weight based on the weight of the total active ingredient. For pour depressing action it is preferred that from .003% to 5% of the additive be blended with the lubricating oil. For viscosity index improvement, amounts varying between 0.5% and 10% may be used. If it is desired, concentrates of the additives of invention may be prepared containing as high as 90% by weight of the additive material. It is often desirable to prepare these concentrates in such high concentrations for ease in handling and in storage.

The lubricant additives prepared according to the concept of this invention may be blended with any of the other known lubricant additives with excellent results. The inventive products are preferably compatible with such materials as extreme pressure agents, oxidation inhibitors, other pour depressants, other viscosity index improvers, oiliness agents, corrosion inhibitors, and the like.

In summation, this invention relates to an improved process for the preparation of lubricating oil additives which comprises copolymerization of ethylenically unsaturated polycarboxylic acid esters of a mixture of alcohols, each containing from 8 to 18 carbon atoms, the mixture having an average of 12 to 14 carbon atoms with other polymerizable monomeric materials in the presence of an oxygen-containing gas. The presence of the reactive oxygen inhibits gel formation and results in products having outstanding characteristics, particularly in regard to the ability to lower the temperature at which the oil blend loses its characteristic of free flow, that is, to reduce the pour point. Although a great many polymerizable materials are operable in the concept of this invention, the preferred embodiment contemplates the copolymerization of from about 75% to 90% of alpha-beta unsaturated dicarboxylic acid esters of mixtures of alcohols having an average of from 12 to 14 carbon atoms with about 10% to 25% of a vinyl ester in the presence of a peroxide catalyst and controlled amounts of air.

This application is a continuation-in-part of Serial No. 208,747, filed January 31, 1951, for the same inventor, which has been abandoned.

What is claimed is:

1. In a process for the preparation of pour point depressant materials by the copolymerization of alpha-beta unsaturated dicarboxylic acid esters of a mixture of alcohols, said alcohols containing from 8 to 18 carbon atoms per molecule, said alcohol mixture having an average of from 12 to 14 carbon atoms, with polymerizable vinyl esters of lower alkanoic acids, in the presence of an inert solvent, the improvement which comprises the steps of admixing the monomers in said solvent, heating the mixture to a copolymerization temperature in the presence of a peroxide catalyst, introducing sufficient oxygen-containing gas into the reaction mixture so as to maintain the reaction temperature near the equilibrium temperature for the desired period of time, to thereby obtain a copolymeric material having outstanding pour depressing potency.

2. In a process for the preparation of pour point depressant materials by the copolymerization of alpha-beta unsaturated polycarboxylic acid esters of a mixture of alcohols, said alcohols containing from 8 to 18 carbon atoms per molecule, said alcohol mixture having an average of from 12 to 14 carbon atoms, with vinyl acetate in the presence of an inert solvent, the improvement which comprises the steps of admixing the monomers in said inert solvent, adding thereto a peroxide catalyst, heating and maintaining a reaction temperature near the equilibrium temperature of said copolymerization reaction for the desired period of time by the controlled addition of an oxygen-containing gas to said reaction mixture, to thereby obtain a copolymeric material having outstanding pour depressing potency.

3. In a process for the copolymerization of (1) alpha-beta unsaturated dicarboxylic acid esters of the alcohols obtained by hydrogenation of coconut oil with (2) vinyl acetate, which comprises the steps of admixing the monomers in a ratio of about 75% to 90% of the ester with about 10% to 25% of the vinyl acetate in the presence of an inert solvent, heating the mixture to a temperature within the range of room temperature to 250° F. for the desired period of time, the improvement which comprises maintaining the reaction temperature near the equilibrium temperature throughout the reaction by injecting into the reaction mixture controlled amounts of air to obtain a copolymer having outstanding pour depressing potency.

4. A process according to claim 3 wherein said dicarboxylic acid is selected from the class consisting of fumaric and maleic acid.

5. A process according to claim 3 wherein said pour point depressant is obtained by the copolymerization of about 80% of the fumaric acid diester of a mixture of alcohols obtained upon hydrogenation of coconut oil having an average carbon chain length of 13.5 with about 20% of vinyl acetate.

6. A lubricating oil additive material having the desirable characteristic of improving the pour point of waxy mineral lubricating oil into which it has been incorporated consisting essentially of a copolymer of from 75% to 90% of an alpha-beta unsaturated dicarboxylic acid ester of a mixture of alcohols, said alcohols containing from 8 to 18 carbon atoms per molecule, said mixture of alcohols having an average of from 12 to 14 carbon atoms, with from 10% to 25% of vinyl acetate which has been prepared by a process comprising the steps of admixing the monomers in an inert solvent, heating the mixture to a temperature within the range of room temperature to 250° F. in the presence of a peroxide catalyst, and maintaining a sufficient amount of an oxygen-containing gas present during the reaction so as to maintain the reaction temperature near the equilibrium temperature for a period of time sufficient to obtain said copolymer.

7. A lubricating oil additive material according to claim 6 wherein said dicarboxylic acid is selected from the group consisting of fumaric and maleic acid.

8. A lubricating oil additive material according to claim 6 wherein said copolymer is prepared by copolymerizing about 80% of the fumaric acid diester of a mixture of alcohols obtained upon hydrogenation of coconut oil with about 20% of vinyl acetate.

References Cited in the file of this patent

UNITED STATES PATENTS

| 2,443,579 | Fuller et al. | June 15, 1948 |
| 2,443,585 | Salz et al. | June 15, 1948 |
| 2,570,788 | Grammaria | Oct. 9, 1951 |

FOREIGN PATENTS

| 573,175 | Great Britain | Nov. 9, 1945 |

OTHER REFERENCES

Linear Polymers, Frith and Tuckett, Longmans (1951), pp. 57–58.